United States Patent [19]

Wolber et al.

[11] Patent Number: 5,183,252
[45] Date of Patent: Feb. 2, 1993

[54] VACCUM DRUM FOR DIFFERENT SIZED MEDIA

[75] Inventors: Jack Wolber, Merrimack, N.H.; Dieter Froehling, Burlington, Steve Lord, Tewksbury, both of Mass.

[73] Assignee: Eastman Kodak Company, Rochester, N.Y.

[21] Appl. No.: 692,817

[22] Filed: Apr. 25, 1991

Related U.S. Application Data

[63] Continuation of Ser. No. 332,121, Mar. 31, 1989, abandoned.

[51] Int. Cl.⁵ .............................................. B65H 5/02
[52] U.S. Cl. ....................................... 271/276; 271/196
[58] Field of Search .............. 271/276, 196, 275, 194, 271/314

[56] References Cited

U.S. PATENT DOCUMENTS

| | | | |
|---|---|---|---|
| 2,753,181 | 7/1956 | Ananader | 271/196 X |
| 4,056,057 | 11/1977 | Smith | 271/276 X |
| 4,145,040 | 3/1979 | Huber | 271/276 |
| 4,202,542 | 5/1980 | Lammers et al. | 271/276 |
| 4,660,825 | 4/1987 | Umezawa | 271/276 |

*Primary Examiner*—David H. Bollinger
*Attorney, Agent, or Firm*—Kevin A. Sembrat

[57] ABSTRACT

A vacuum drum for securing and retaining different sizes of flexible sheet media has cylindrical surface holes connection different sets of longitudinal bores connected to right and left end radial bore distribution rings. The rings are adapted to be selectively separately connected to external sources of vacuum to provide first and second evacuation zones on the drum surface. A preferred embodiment has left and right shaft section ports connected so that application of a vacuum source to the left port evacuates a first drum zone for holding a smaller sized media, and connection of both left and right ports to a vacuum source evacuates both first and second drum zones for holding a larger media.

20 Claims, 4 Drawing Sheets

VACCUM DRUM FOR DIFFERENT SIZED MEDIA

This application is a continuation of application Ser. No. 07/332,121, filed Mar. 31, 1989 now abandoned.

This invention relates to a vacuum hold-down drum for securing and supporting different sized media in such applications as for laser scanning or printing.

BACKGROUND OF THE INVENTION

Vacuum drums in the form of a rotary member having vacuum suction holes opening onto a cylindrical surface for the support of flexible sheet media peripherally thereof are known for various applications. Paper processing and printing machines, for example, utilize such rotary vacuum drums to convey sheets from one part of the machine to another. Other machines, such as laser printers and rotary data scanning and recording devices, use similar drums to support a flexible data plate medium for interaction with a printing or recording head.

It is a common problem in such devices, especially in large drum devices, to experience local distortion of the retained medium caused by deformation of the drum surface due to vacuum draw through the cylindrical shell into an internal chamber. Another problem, where the same drum is used to handle various sized media is the loss of vacuum force at uncovered holes.

Various approaches have been taken for supporting flexible sheet material of different sizes on a vacuum drum surface. Those employing means to close uncovered holes when smaller sized sheets are drawn to the surface, tend to be complicated structures with elaborate mechanical channeling movements, such as shown in U.S. Pat. Nos. 4,145,040 and 4,202,542.

SUMMARY OF THE INVENTION

It is an object of the present invention to provide a vacuum drum to secure and support various sized flexible media by vacuum force peripherally of the drum, with little or no deformability of the drum surface due to vacuum draw through the shell and with readily selectable means for porting the surface to close the holes of uncovered surface zones.

In one aspect of the invention, a novel drum is provided for securing and supporting flexible media by vacuum force peripherally of a cylindrical surface thereof which has longitudinally extending gun-drilled bores located just below the drum surface. Pluralities of radially extending channels at respective ends of the drum applies suction force through surface holes connecting the gun-drilled bores to secure the media to the drum surface. The use of gun-drilled holes reduces or eliminates deformability of the drum surface caused by a vacuum draw through the shell.

In another aspect of the invention, longitudinal bores just below the drum surface extend from opposite ends of the drum to connect to different radial channels for connection to respective opposite vacuum ports on the drum shaft to provide vacuum suction zone selection for different sized media, without the necessity for mechanical porting changes on the drum itself.

BRIEF DESCRIPTION OF THE DRAWINGS

Throughout the drawings like elements are referred to by like numerals.

DETAILED DESCRIPTION OF PREFERRED EMBODIMENTS

Figure 1:
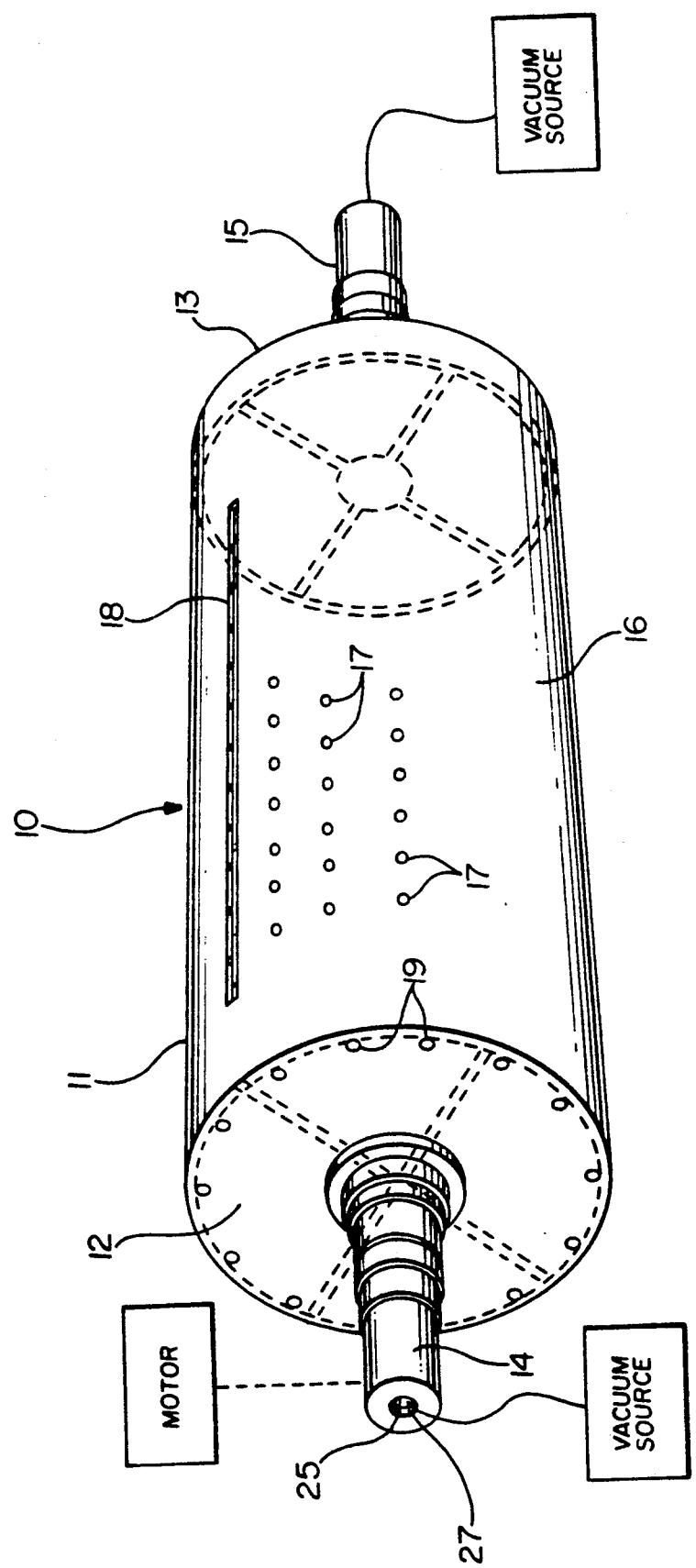
FIG. 1 is a schematic view of a drum in accordance with one embodiment of the invention.

As shown in FIG. 1, a vacuum drum 10 in accordance with the invention has a tubular sleeve central section 11, to the left and right ends of which are attached circular end plates in the form of distribution rings 12, 13 which are joined centrally by outwardly protruding left and right axial shaft sections 14, 15. The central section 11 provides a cylindrical outer surface 16 onto which a plurality of vacuum holes or apertures 17 open to provide air suction for securing and retaining a sheet of flexible medium on the surface 16 peripherally of the sleeve section 11. The holes 17 open directly onto the cylindrical surface 16, except at a leading edge region which is provided with a longitudinally extending groove 18 into which a leading edge of the medium can be applied.

A plurality of gun-drill bores 19 is provided longitudinally of the sleeve 11 in a marginal portion thereof, just below the drum surface 16. The bores 19 provide evacuation passages for imparting suction force at the holes 17. The bores 19 are drilled from left and right ends of the drum 10 in accordance with a vacuum zone scheme, described further below, to provide selective vacuum communication with all or part of a longitudinally aligned row of holes 17 of the surface 16.

The end plates 12, 13 (see FIGS. 2 and 3) are respectively provided with radial bores 20 that connect in spoke-like manner by means of annular chambers 21, 22, 23 with different zone-associated ones of the bores 20. As shown, the shafts 14, 15 are each provided with blind end axial bores 25 that open at evacuation ports 27 on the free ends of the shafts 14, 15, and connect by means of transverse bores 26 with corresponding radial bores 20.

Figure 2:
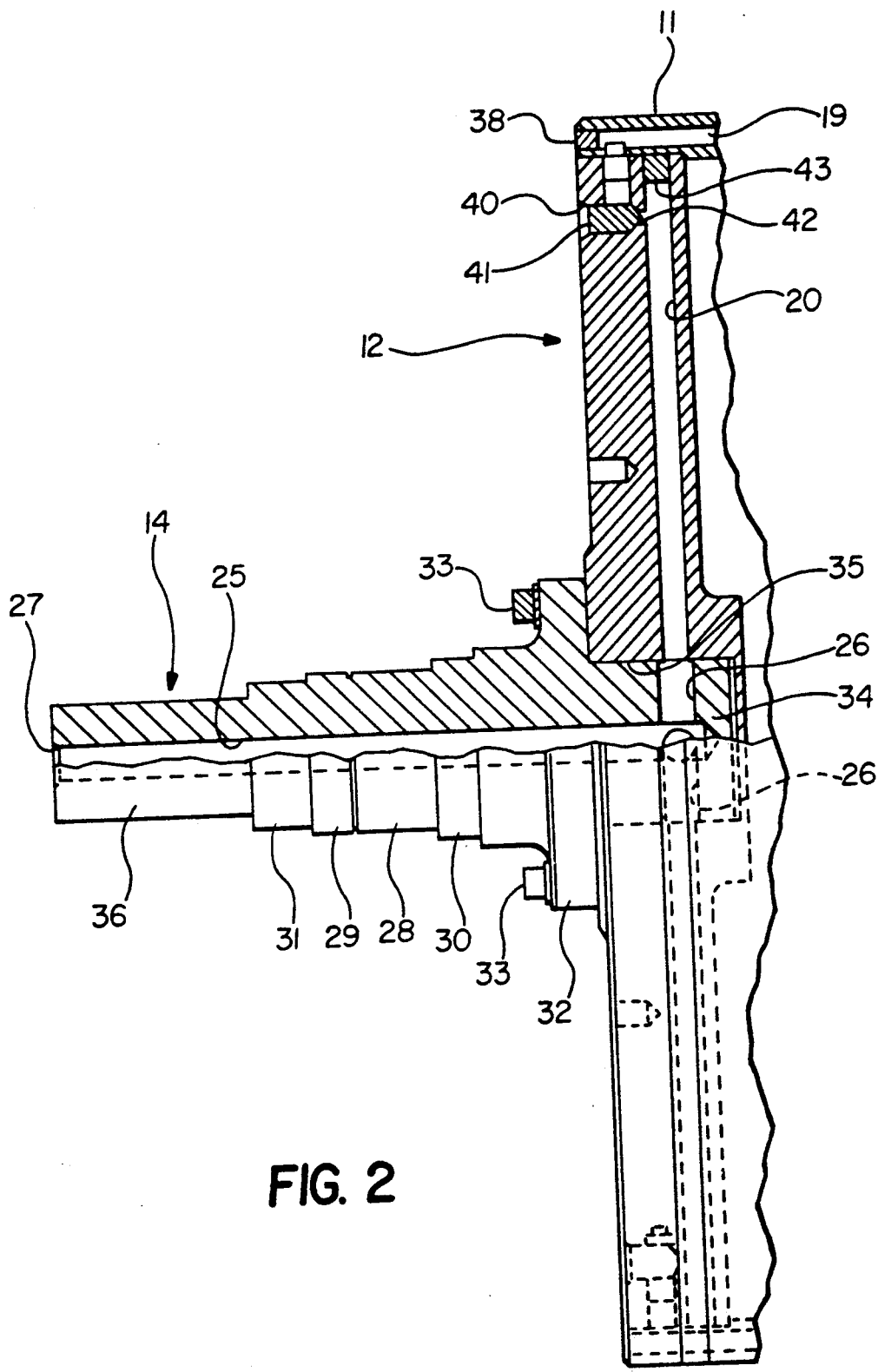
FIG. 2 is a side view, partially in section, of the left end of the drum of FIG. 1.

Each shaft 14, 15 comprises a stepped diameter element, including a bearing 28, nut 29 and seals 30, 31 as indicated in FIG. 2. The inside end of the shaft 14 has an enlarged diameter portion 32 which has a planar inside surface that is brought flush against a matching outside surface of a central portion of the end plate 12 and is rigidly attached thereto by conventional fasteners 33. The inside end 34 of the shaft 14 has an outside diameter less than the diameter of the portion 32 and configured to fit snugly within a cylindrical, closed inside end cavity 34 which opens axially onto the external surface of the plate 12. The radial bores 20 of the plate 12 are formed to connect at their inside ends to the cavity 35 and the shaft 14 is dimensioned, configured and adapted so that the transverse bores 26 open into the cavity 35 at positions opposite the inside ends of the bores 20. The sealing of junctures between the shaft 14 and the distribution ring end 12 is accomplished in accordance with well-known techniques.

The free end 36 of the shaft 14 has a reduced diameter and is accommodated in conventional vacuum journalling manner for controlled location of the shaft 14 under motor action in accordance with the particular application and for controlled evacuation of the axial bore 25 by a suitable vacuum source which draws air out through the port 27 (see FIG. 1). The construction of the end plate 13 and shaft section 15 of the right end of the drum 10 is the same as that described above for the left plate 12 and shaft section 14.

It is noted that it is usual for many prior art vacuum drums to provide motor drive and vacuum port journalling only at one end. The other shaft end is unported, with no axial vacuum bore, and is journalled merely for free rotation without connection to a vacuum source. A tachometer or other rotational speed and/or angular position sensing device is often applied at the unported shaft connection. For the described embodiment of the invention, however, both the left and right shaft sections 14 and 15 are ported for selective connection of one or both ports 27 for evacuation of air from the corresponding left and right bores 20 and the bores 19 which connect thereto. Though not the preferred embodiment, it will be appreciated that the shaft 15, for example, may be left unported and a second replacement passage provided through shaft 14 with appropriate connection made to be able to selectively evacuate the bores 20 of right plate 13 separately from the bores 20 of the left plate 12.

The end plate 12 (see FIG. 2) is preferably formed of an outside diameter to fit within the sleeve section 11 for a distance sufficient to bring the exposed, generally planar outside surface of the plate 12 flush with the generally planar annular ring end surface of the sleeve 11 at which the bores 19 terminate. Abutting portions of plates 12, 13 and sleeve 11 are appropriately sealed and secured in fixed, mating relationship such as by fasteners 24 (FIG. 3) that connect the end plates 12, 13.

The longitudinal bores 19 are formed using gun-drill boring methods to drill through the sleeve 11 to form longitudinally aligned smooth bores just below the surface 16 at angularly-spaced positions selected as discussed below. The open ends of the bores 20 are closed with plugs 38 after the finishing process. The holes 17 (FIG. 1) are drilled radially from the surface 16 to meet the bores 19. The lengths of the bores 19, the positions of the holes 17 and the connections between the ends of the bores 17 and the annular chambers 21, 22, 23 are determined in accordance with the size requirements of the media.

It is considered advantageous to communicate the radial bores 20 indirectly with the annular chambers 21, 22, 23 by the intermediary of longitudinally disposed passages 40 which join the bores 20 at points inwardly of the outer ends thereof (FIG. 2). Set screws 41 having conical-shaped ends can then be received within the passages 40 to control the size of the opening of the orifice 42 through which the vacuum is drawn. The otherwise open outside ends of the radial bores 20 are closed by means of plugs 43 prior to installation of the end plates 12, 13 within the sleeve 11.

Figure 3:
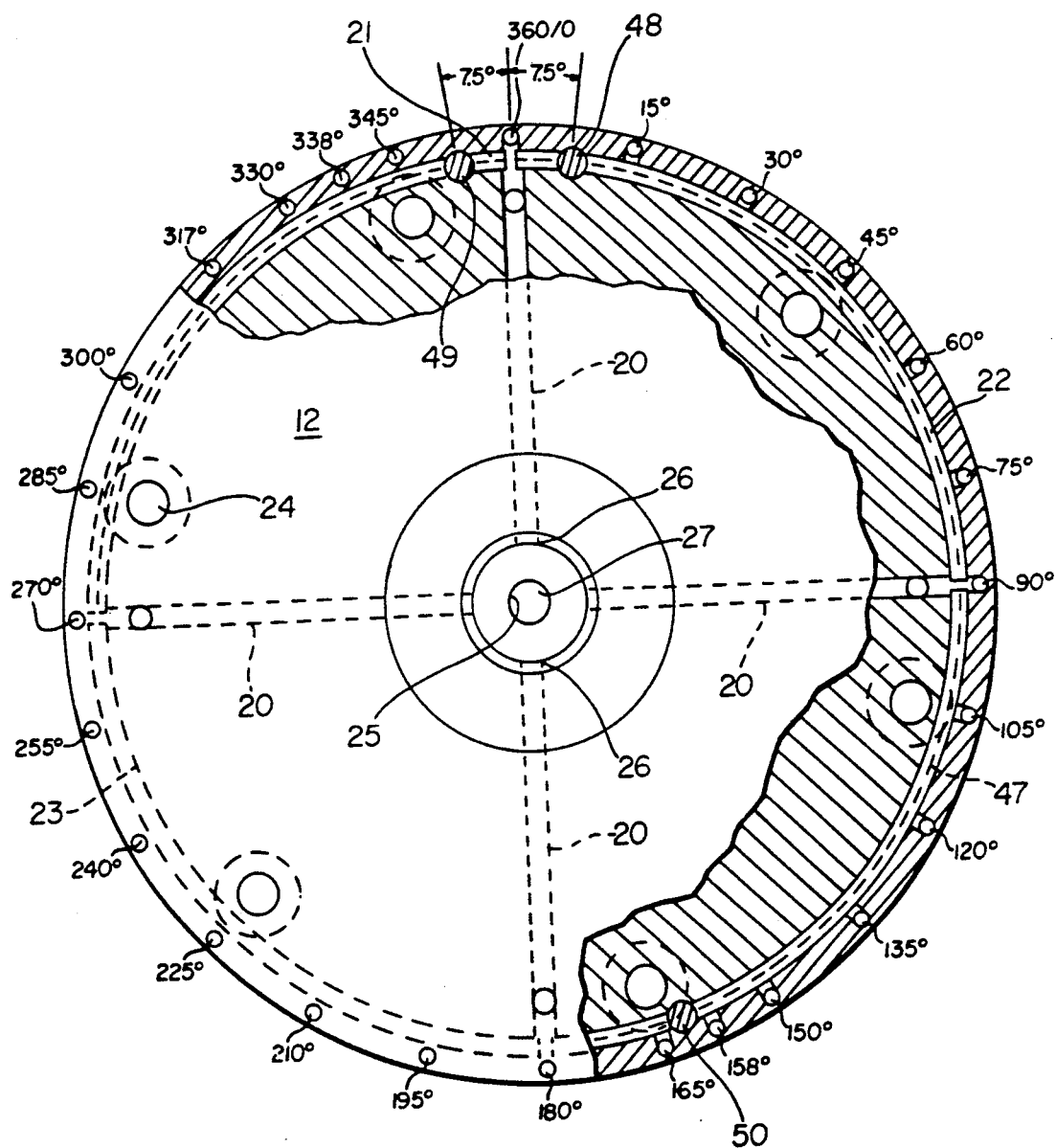
FIG. 3 is a cutaway, left end view, of the drum of FIG. 1.
Figure 4:
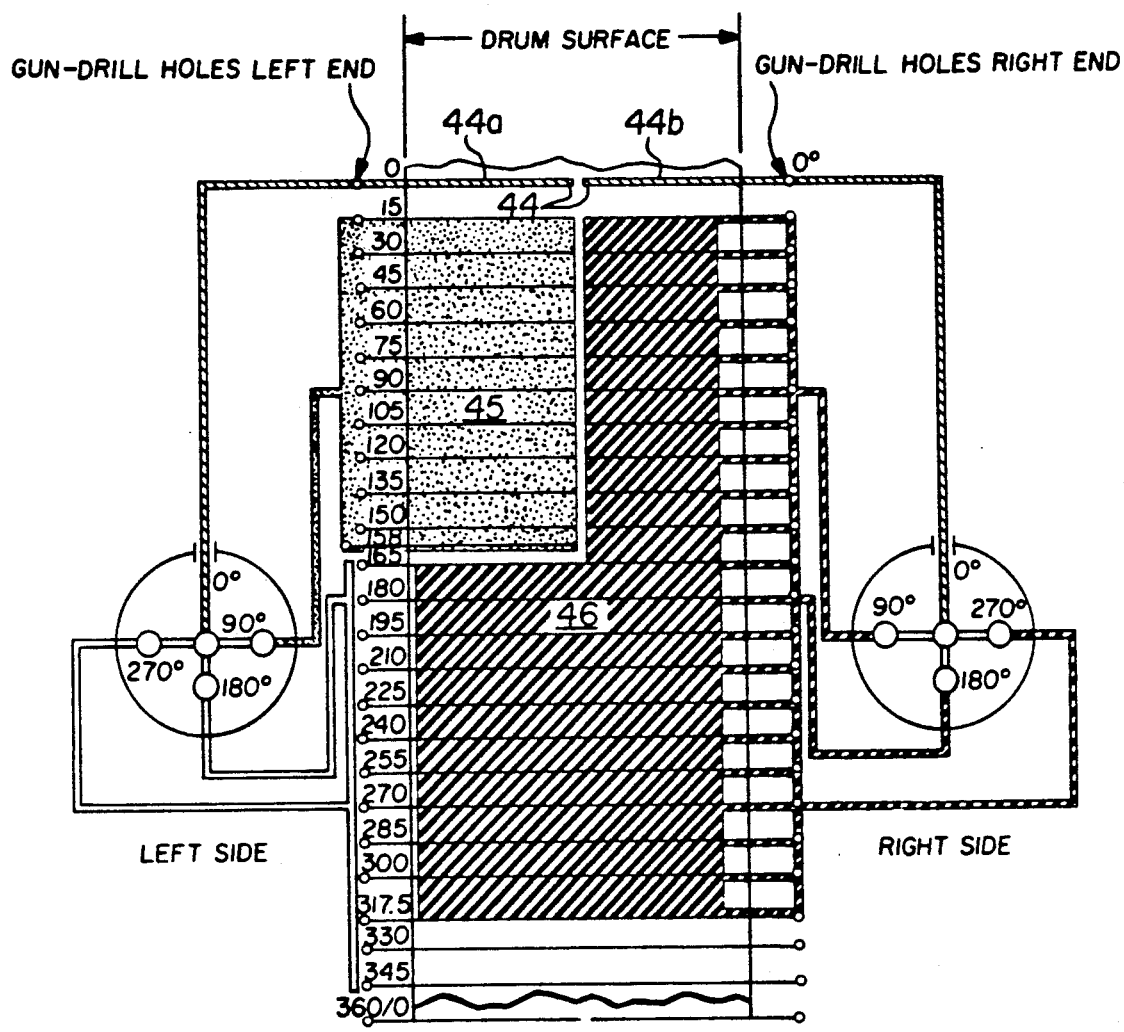
FIG. 4 is a schematic diagram of the unfolded drum showing a vacuum line pattern for the drum of FIG. 1.

FIGS. 3 and 4 show one scheme for applying the bores 19, 20 and holes 17 to accommodate various different sized media on the drum surface 16. The illustrated embodiment divides the drum surface into three vacuum zones 44, 45 and 46 to accommodate two standard media sizes. Zone 44 represents a vacuum applied to the leading edge groove 18 and has two subzones 44a and 44b, the leading edge of the smaller sized medium being held when a vacuum is applied to the subzone 44a and the leading edge of the larger sized medium being held when a vacuum is applied to both subzones 44a and 44b. Zone 45 is dimensioned to secure the remainder of the smaller sized medium in desired positional relationship peripherally of the drum 10; and zone 46 covers that part of the drum surface 16, not covered by the zone 45, which is needed to retain the larger sized medium on the drum 10. The zones can be arranged as necessary in consideration of the surface area of drum 10 to accommodate any two desired paper sizes such as, for example, letter-sized (8½"×11") and legal-sized (8½"×14") printable media, and additional zones may be configured to similarly accommodate more than two sizes. In the latter case, the porting of the distribution ring end plates 12, 13 and the shafts 14, 15 will, of course, have to be modified consistent with the teachings of the invention.

The particular configuration of zones 44, 45, and 46 shown contemplates the accommodation of large format media of 30"×40" and 44"×66" flexible sheets on an approximately 2' diameter large imaging drum of appropriate width. The scheme contemplates use of identical left-side and right-side vacuum distribution ring end plates 12, 13 with non-used annular channel 23 of the left plate 12 blocked by tightening down the appropriate set screw plug members 31.

With reference to FIGS. 3 and 4, it will be seen that longitudinal bores 19 are provided at 15° angular increments circumferentially clockwise around the sleeve shell 11. To accommodate the media sizes mentioned, however, an additional bore is provided at 158°, and the bore which would be located at 315° is positioned instead at 317.5°. The bores 19 from 165° through 345° are made to run the full length of the drum 10. The bores 19 from 15° through 150° are made noncontinuous by either blocking them at an identical position along their lengths, or by boring them separately to provide left and right opening, unconnected, though coaxial, blind bore sections drilled respectively from the left and right ends of the sleeve 11. The 0° bore may be treated the same as the 15° to 150° bores or, if desired, drilled completely through as with the 165° to 345° bores. (Because of the manner of applying the full vacuum from one of the vacuum spokes 20 to just one gun-drilled passage 19 at the 0° position to evacuate the leading edge groove 18, as more fully described below, the uncovered holes of the zone 44b when the smaller sized media is applied to the drum surface 16 may not interfere significantly with the leading edge holding capability of the vacuum applied at that position.)

As shown in FIG. 3, radial bores 20 are provided in each end plate 12, 13 at 90° angular increments, at 0°, 90°, 180° and 270° positions. The chambers 21, 22 and 23 can be provided suitably as shown by a single circular groove 47 (FIG. 3) established either in the inside diameter of the sleeve 11 or the outside diameter of the end rings 12, 13 in the facing surfaces of the sleeve 11 and end rings 12, 13. Seals 48, 49, 50 are placed within the groove 47 to divide it into the annular chambers 21, 22, 23. For the depicted embodiment, seals 48, 49 are positioned midway between the 0° bore 19 and the 15° and 345° bores 19, respectively; and the seal 50 is positioned between the 158° and 165° bores. (It is not necessary to utilize a seal 50 in the right end plate 13 because the vacuum will be applied from the right side to all bore positions between 15° and 345°.)

The amount of vacuum applied by the spoke channels 20 from the vacuum ports 27 can be adjusted by means of the set screws 41. For the particular implementation shown in FIGS. 3-4, the set screws 41 of the left-hand distribution ring 12 are screwed tightly into the passages 40 at the 180° and 270° positions to completely plug the orifices 42 at those locations to seal off communication between the corresponding bores 20 and the chamber 23. The plugs 41 at the 0° and 90° positions are used for fine adjustment, if necessary, of the full vacuum applied by means of the port 27 of the left shaft section 14 to the chambers 21 and 22. When a vacuum is drawn at the left port 27, the left distribution ring plate 12, as described, will apply a vacuum to the bore 19 extending into the leading edge groove at zone 44a (and 44b if desired) and to the 15° through 158° blind bores extending into the zone 45. Because of the tight plugging of the 180° and 270° spoke bores 20, no vacuum will be applied to the 165° through 345° bores, however. The right plate 13 has set screws 41 at the 0°, 90°, 180° and 270° positions open to apply full vacuum from the right-hand port 27 of the shaft 15 (except for fine adjustment) to the leading edge groove at zone 44b, the full partial blind bores 19 from 15° to 150°, and to the full length bores 19 from 155° to 330°. The right end chamber 23 includes a seal (not seen in the left end view of FIG. 3) between the 317.5° and 330° bore positions to provide a latency or dead zone beyond the trailing edge of the large sized medium.

In operation, the vacuum drum 10 functions to apply a vacuum to leading edge zone 44a and the small sized medium zone 45, whenever a vacuum is applied to the evacuation port 27 of the left-hand shaft 14. When no active vacuum connection is established to the port 27 of the right shaft 15, no vacuum is applied to the zone 46. If a vacuum source is applied to the right port 27, a vacuum is drawn also at the zones 44b and 46.

Holes 17 are appropriately positioned over the surface 16 of the drum 10 at intervals on rows along the respective longitudinally extending evacuation passages 19 so that when a vacuum is applied at the left port 27, the small sized medium will be held with its leading edge in the groove 18 evacuated at zone 44a, and the rest of that medium held to the drum 11 at zone 45, with its trailing edge held by suction force applied at the holes 17 communicating with the blind bore 19 at the 158° position. In this manner, the small sized medium will be held to the drum with no vacuum loss at uncovered holes in the zones 44b or 46. When a vacuum is additionally applied to the right port 27, those portions of a larger sized medium which would not otherwise be drawn to the surface 16 by the holes 17 of zones 44a and 45 will now also be drawn to the drum through evacuation of the holes 17 at the zones 44b and 46. In accordance with conventional techniques, 0.039" diameter holes 17 can be provided in typical spacing on a rectangular grid pattern, with extra holes at trailing edges and larger holes at the leading edge. A leading edge milled shelf may also be provided.

It will thus be appreciated that the invention provides a simple vacuum distribution arrangement that provides sucking force to a plurality of preselected zones on a drum surface to accommodate different sized media without adversely affecting the applied vacuum by uncovered holes and without the necessity of having to move parts on the drum during operation to control the channeling of the vacuum to separate zones. Application of a vacuum to the holes of the drum to secure the particular size of paper encountered is chosen externally of the drum in accordance with which port or ports 27 are connected to a vacuum source. As already mentioned, the zones can be modified to serve more than two different sizes of media, and corresponding other or additional shaft located bores can be arranged for selective connection to a vacuum source. While the central portion of the drum 10 is shown as a hollow sleeve 11, this is not a requirement for the drum 10 of the invention and the same may be implemented using a solid cylindrical central section, if desired. In either case, the use of longitudinal bores as described eliminates or at least reduces significantly local distortion of the cylindrical surface 16 which occurs with prior art vacuum drums drawing the vacuum through holes connecting the outer surface with an internal evacuated chamber.

Those skilled in the art to which the invention relates will appreciate that various other substitutions and modifications may be made to the described embodiments without departing from the spirit and scope of the invention as defined by the claims below.

What is claimed is:

1. A vacuum drum for securing and retaining different sized sheets of flexible media thereon, comprising:
    an elongated tubular sleeve member having a hollow interior, a cylindrical wall with an outer surface, a first set of elongated evacuation bores extending longitudinally partway in said wall internally adjacent to said surface, a second set of elongated evacuation bores extending longitudinally partway in said wall internally adjacent to said surface in respective unconnected coaxial relationships to said first set bores, and a multiplicity of holes respectively arranged to place said first and second sets of bores in evacuation communication with first and second zones on said surface;
    shaft means, having first and second evacuation ports, for mounting said elongated member for axial rotation; and
    channel means for separately communicating said first and second sets of bores, externally of said member, respectively with said first and second ports; so that connection of said first port to a vacuum source will evacuate said holes of said first zone on said surface, with no evacuation within said sleeve member interior; and connection of said second port to a vacuum source will evacuate said holes of said second zone, with no evacuation within said sleeve member interior; the selective evacuation of said holes of said first and second zones serving to accommodate said different sized sheets.

2. A vacuum drum for securing and retaining larger-sized and smaller-sized sheets of flexible material thereon, comprising:
    an elongated tubular sleeve member having a hollow interior and a cylindrical wall with an outer surface including a first surface zone corresponding in size to the size of the smaller-sized sheet, and a second surface zone located adjacent to said first zone and which, when combined with said first zone, corresponds in size to the size of the larger-sized sheet; first and second unconnected sets of longitudinally extending bores drilled in said wall at respective angularly-spaced locations internally adjacent said surface; a first multiplicity of holes in said wall respectively arranged to place said first set of bores in communication with said first zone; and a second multiplicity of holes in said wall respectively arranged to place said second set of bores in communication with said second zone; and
    shaft means, having first and second evacuation ports, for mounting said elongated sleeve member for axial rotation;

said member further having a first channel for communicating said first set of bores with said first port externally of said sleeve, and a second channel for communicating said second set of bores with said second port externally of said sleeve; said first and second channels beings respectively dimensioned, configured and adapted so that connection of said first port to a vacuum source will evacuate the holes of said first multiplicity to provide sucking forces to hold the smaller sized sheet on said surface peripherally over said first zone, with no evacuation within said sleeve interior; and connection of both said first and second ports to a vacuum source will evacuate the holes of both said first and second multiplicities to provide sucking forces to hold the larger-sized sheet on said surface peripherally over said combined first and second zones, with no evacuation within said sleeve interior.

3. A vacuum drum for securing and retaining larger-sized and smaller-sized sheets of flexible material thereon, comprising:

an elongated tubular sleeve having a hollow interior, left and right ends, and a cylindrical marginal wall portion with an outer surface including a first surface zone corresponding in size to the size of the smaller-sized sheet, and a second surface zone located adjacent to said first zone and which, when combined with said first zone, corresponds in size to the size of the larger-sized sheet; first and second unconnected sets of longitudinally extending bores drilled in said wall portion at respective angularly-spaced locations internally adjacent said surface, said first set bores opening to said left end and said second set bores opening to said right end; a first multiplicity of holes in said wall portion respectively arranged to place said first set of bores in communication with said first zone; and a second multiplicity of holes in said wall portion respectively arranged to place said second set of bores in communication with said second zone;

left and right end plates respectively attached to said left and right ends of said sleeve; and left and right shaft sections respectively attached in axially outwardly protruding positions to said end plates for rotatively mounting said drum;

said shaft sections being respectively provided with left and right axially outwardly extending evacuation ports; said left end plate being provided with a first radial bore for communicating said first set of bores with said left port, externally of said sleeve through said left end plate, and said right end plate being provided with a second radial bore for communicating said second set of bores with said right port, externally of said sleeve through said right end plate; said first and second radial bores being dimensioned, configures and adapted so that connection of said left port to a vacuum source will evacuate the holes of said first multiplicity to provide sucking forces to hold the smaller-sized sheet on said surface peripherally over said first zone, with no evacuation within said sleeve member interior; and connection of both said left and right ports to a vacuum source will evacuate the holes of both said first and second multiplicities to provide sucking forces to hold the larger-sized sheet on said surface peripherally over said combined first and second zones, with no evacuation within said sleeve member interior.

4. A vacuum drum for securing and retaining larger-sized and smaller-sized sheets of flexible material thereon, comprising:

an elongated member having a cylindrical body with an outer surface including a first surface zone corresponding in size to the size of the smaller-sized sheet; a second surface zone located adjacent to said first zone and which, when combined with said first zone, corresponds in size to the size of the larger-sized sheet; and a third surface zone corresponding in size to the size of a leading edge of the larger-sized sheet, said third zone including a first surface subzone located adjacent said first zone and corresponding in size to the size of a leading edge of the smaller-sized sheet; first and second unconnected sets of longitudinally extending bores drilled in said body at respective angularly-spaced locations internally adjacent said surface; a first multiplicity of holes in said body respectively arranged to place said first set of bores in communication with said first zone; a second multiplicity of holes in said body respectively arranged to place said second set of bores in communication with said second zone; and a third multiplicity of holes in said body respectively arranged to place said first set of bores in communication with said third zone at least at said first surface subzone; and shaft means, having first and second evacuation ports, for mounting said elongated member for axial rotation;

said member further having first channel means for communicating said first set of bores with said first port, and second channel means for communicating said second set of bores with said second port; said first and second channel means being respectively dimensioned, configures and adapted so that connection of said first port to a vacuum source will evacuate the holes of said first and third multiplicities to provide sucking forces to hold the smaller sized sheet on said surface peripherally over said first zone and first subzone, and connection of both said first and second ports to a vacuum source will evacuate the holes of said first, second and third multiplicities to provide sucking forces to hold the larger-sized sheet on said surface peripherally over said combined first and second zones and said first subzone.

5. A vacuum drum as in claim 4, wherein said bores are gun-drilled bores.

6. A vacuum drum as in claim 4, wherein said third zone further includes a second surface subzone located adjacent to said second zone and corresponding in size to the difference between the sizes of leading edges of the larger-sized and smaller-sized sheets; said third multiplicity of holes is arranged to place said first set of bores in communication with said first surface subzone but not with said second surface subzone; said member further has a fourth multiplicity of holes in said body respectively arranged to place said second set of bores in communication with said second surface subzone; and said first and second channel means are further respectively dimensioned, configured and adapted so that said connection of both said first and second ports will also evacuate the holes of said fourth multiplicity to provide sucking forces to hold the larger-sized sheet also over said second subzone.

7. A vacuum drum for securing and retaining larger-sized and smaller-sized sheets of flexible material thereon, comprising:

an elongated member having a cylindrical body with an outer surface including a first surface zone corresponding in size to the size of the smaller-sized sheet, and a second surface zone located adjacent to said first zone and which, when combined with said first zone, corresponds in size to the size of the larger-sized sheet; first and second unconnected sets of longitudinally extending bores drilled in said body at respective angularly-spaced locations internally adjacent said surface; a first multiplicity of holes in said body respectively arranged to place said first set of bores in communication with said first zone; a second multiplicity of holes in said body respectively arranged to place said second set of bores in communication with said second zone; and first and second annular chambers respectively in communication with said first and second sets of bores;

shaft means, having first and second evacuation ports, for mounting said elongated member for axial rotation;

said member further having at least one first radial bore for communicating said first annular chamber with said first port, and at least one second radial bore for communicating said second annular chamber with said second port; said at least one first and second radial bores being respectively dimensioned, configured and adapted so that connection of said first port to a vacuum source will evacuate the holes of said first multiplicity to provide sucking forces to hold the smaller-sized sheet on said surface peripherally over said first zone, and connection of both said first and second ports to a vacuum source will evacuate the holes of both said first and second multiplicities to provide sucking forces to hold the larger-sized sheet on said surface peripherally over said combined first and second zones.

8. A vacuum drum as in claim 7, wherein said chambers are partitioned into subchambers; and said at least one radial bores comprise pluralities of radial bores arranged in spoke-like fashion, with separate radial bores connecting each port to each subchamber.

9. A vacuum drum as in claim 8, further comprising valve means cooperating with said radial bores to separately control the extent of communication of each subchamber with its associated port.

10. A vacuum drum as in claim 7, wherein said body comprises a hollow tubular sleeve having first and second open ends, said member further includes first and second end plates respectively attached at said first and second ends; said shaft means comprises first and second shaft sections respectively attached to said first and second end plates; and said radial bores are formed in said end plates.

11. A vacuum drum as in claim 10, wherein said open ends have an inside diameter, said end plates are circular end plates having an outside diameter to match said inside diameter, and said first and second annular chambers are respectively formed circumferentially in said first and second end plates.

12. A vacuum drum as in claim 7, wherein said bores of said first and second sets are angularly-spaced at generally 15° intervals.

13. A vacuum drum as in claim 7, wherein said first and second multiplicities of holes comprise multiplicities of holes respectively positioned at intervals in longitudinally extending rows along said bores of said first and second sets.

14. A vacuum drum for securing and retaining larger-sized and smaller-sized sheets of flexible material thereon, comprising:

an elongated central section having left and right ends and a hollow cylindrical marginal wall portion with an outer surface including a first surface zone corresponding in size to the size of the smaller-sized sheet, a second surface zone located adjacent to said first zone and which, when combined with said first zone, corresponds in size to the size of the larger-sized sheet, and a third surface zone corresponding in size to the size of a leading edge of the larger-sized sheet, said third zone including a first surface subzone located adjacent said first zone and corresponding in size to the size of a leading edge of the smaller-sized sheet; first and second unconnected sets of longitudinally extending bores drilled in said wall portion at respective angularly-spaced locations internally adjacent said surface, said first set bores opening to said left end and said second set bores opening to said right end; a first multiplicity of holes in said wall portion respectively arranged to place said first set bores in communication with said first zone; a second multiplicity of holes in said wall portion respectively arranged to place said second set bores in communication with said second zone; and a third multiplicity of holes in said wall portion respectively arranged to place said first set of bores in communication with said third zone at least at said first surface subzone;

left and right end plates respectively attached to said left and right ends of said sleeve; and left and right shaft sections respectively attached in axially outwardly protruding positions to said end plates for rotatively mounting said drum;

said shaft sections being respectively provided with left and right axially outwardly extending evacuation ports; said left end plate being provided with a first plurality of radial bores for communicating said first set of bores with said left port, and said right end plate being provided with a second plurality of radial bores for communicating said second set of bores with said right port; said first and second pluralities of radial bores being dimensioned, configures and adapted so that connection of said left port to a vacuum source will evacuate the holes of said first and third multiplicities to provide sucking forces to hold the smaller-sized sheet on said surface peripherally over said first zone and first subzone, and connection of both said left and right ports to a vacuum source will evacuate the holes of both said first, second and third multiplicities to provide sucking forces to hold the larger-sized sheet on said surface peripherally over said combined first and second zones and said first subzone.

15. A vacuum drum as in claim 14, wherein said third zone further includes a second surface subzone located adjacent to said second zone and corresponding in size to the difference between the sizes of leading edges of the larger-sized and smaller-sized sheets; said third multiplicity of holes is arranged to place said first set of bores in communication with said first surface subzone but not with said second surface subzone; said member further has a fourth multiplicity of holes in said wall portion respectively arranged to place said second set of bores in communication with said second surface subzone; and said first and second pluralities of radial bores are further respectively dimensioned, configured and adapted so that said connection of both said left and right ports will also evacuate the holes of said fourth multiplicity to provide sucking forces to hold the larger-sized sheet also over said second subzone.

16. A vacuum drum as in claim 15, wherein said left and right end plates further have left and right annular chambers respectively communicating said first and second pluralities of radial bores with said first and second sets of bores.

17. A vacuum drum as in claim 16, wherein said left and right chambers are each partitioned into first and second subchambers; and said radial bores are arranged in spoke-like fashion, with separate radial bores connecting each port to each subchamber; and said bores of said first and second sets connect to said subchambers so that each subchamber communicates only with holes associated with a single zone or subzone.

18. A vacuum drum as in claim 17, further comprising valve means cooperating with said radial bores to separately control the extent of communication of each subchamber with its associated port.

19. A vacuum drum as in claim 18, wherein said bores of said first and second sets are angularly-spaced at generally 15° intervals.

20. A vacuum drum as in claim 19, wherein said first, second, third and fourth multiplicities of holes comprise multiplicities of holes respectively positioned at intervals in longitudinally extending rows along said bores of said first and second sets.

* * * * *